United States Patent
Kawamura (10) Patent No.: US 9,606,394 B2
(45) Date of Patent: Mar. 28, 2017

(54) SET OF POLARIZING PLATES AND FRONT-PLATE-INTEGRATED LIQUID CRYSTAL DISPLAY PANEL

(71) Applicant: Sumitomo Chemical Company, Limited, Tokyo (JP)

(72) Inventor: Takahito Kawamura, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/026,648

(22) PCT Filed: Sep. 29, 2014

(86) PCT No.: PCT/JP2014/075817
§ 371 (c)(1),
(2) Date: Apr. 1, 2016

(87) PCT Pub. No.: WO2015/050074
PCT Pub. Date: Apr. 9, 2015

(65) Prior Publication Data
US 2016/0238890 A1    Aug. 18, 2016

(30) Foreign Application Priority Data
Oct. 3, 2013    (JP) .................................. 2013-208479

(51) Int. Cl.
*G02F 1/1335*    (2006.01)
*G02B 5/30*    (2006.01)
*G02F 1/13363*    (2006.01)

(52) U.S. Cl.
CPC ..... *G02F 1/133528* (2013.01); *G02B 5/3025* (2013.01); *G02F 1/13363* (2013.01);
(Continued)

(58) Field of Classification Search
CPC ... G02F 1/133528; G02F 2001/133562; G02F 2001/133567; G02F 2201/50;
(Continued)

(56) References Cited

U.S. PATENT DOCUMENTS 7,063,872 B1    6/2006    Amimori et al.
8,525,405 B2    9/2013    Kuwabara et al.
(Continued)

FOREIGN PATENT DOCUMENTS

JP    H02-27121 U    2/1990
JP    2000009908 A    1/2000
(Continued)

OTHER PUBLICATIONS

Office Action issued Nov. 17, 2015 in JP Application No. 2013208479.
(Continued)

*Primary Examiner* — Nathanael R Briggs
(74) *Attorney, Agent, or Firm* — Panitch Schwarze Belisario & Nadel LLP (57) ABSTRACT

Provided is a set of polarizing plates comprising a front-plate-integrated polarizing plate to be disposed at a viewing side of a liquid crystal cell and a back-side polarizing plate to be disposed at a back-side of the cell. The front-plate-integrated polarizing plate includes a front-side polarizing plate and a front plate having a Young's modulus of 2 GPa or more. An amount of shrinkage observed in the front-side polarizing plate in an absorption axis direction after the front-side polarizing plate is stuck to a glass substrate and heated at 85° C. for 500 hours is taken as X, and an amount of shrinkage observed in the back-side polarizing plate in an absorption axis direction after the back-side polarizing plate is stuck to a glass substrate and heated at 85° C. for 500
(Continued)

hours is taken as Y, the amount of shrinkage X being smaller than the amount of shrinkage Y.

8 Claims, 3 Drawing Sheets

(52) U.S. Cl.
CPC ............ *G02F 2001/133562* (2013.01); *G02F 2001/133567* (2013.01); *G02F 2201/50* (2013.01); *G02F 2201/54* (2013.01); *G02F 2202/28* (2013.01)

(58) Field of Classification Search
CPC ............ G02F 2201/54; G02F 2202/28; G02F 1/13363; G02B 5/3025
See application file for complete search history.

(56) References Cited

U.S. PATENT DOCUMENTS

| | | | |
|---|---|---|---|
| 2005/0260392 A1* | 11/2005 | Sugino | G02B 5/3033 428/212 |
| 2006/0268200 A1 | 11/2006 | Ohgaru et al. | |
| 2007/0081209 A1 | 4/2007 | Wada | |
| 2010/0157205 A1* | 6/2010 | Kiya | G02B 5/3033 349/96 |
| 2011/0292097 A1* | 12/2011 | Kobayashi | G02F 1/1336 345/690 |
| 2013/0004700 A1 | 1/2013 | Jo et al. | |
| 2013/0050614 A1* | 2/2013 | Inoue | G02B 5/3025 349/62 |
| 2013/0169911 A1 | 7/2013 | Haida et al. | |

FOREIGN PATENT DOCUMENTS

| | | |
|---|---|---|
| JP | 2001033775 A | 2/2001 |
| JP | 2002127286 A | 5/2002 |
| JP | 2002221715 A | 8/2002 |
| JP | 2002236213 A | 8/2002 |
| JP | 2006126585 A | 5/2006 |
| JP | 2006330390 A | 12/2006 |
| JP | 2007133350 A | 5/2007 |
| JP | 2007144926 A | 6/2007 |
| JP | 2009103818 A | 5/2009 |
| JP | 2009265215 A | 11/2009 |
| JP | 2012058429 A | 3/2012 |
| JP | 2012128384 A | 7/2012 |
| JP | 2012159778 A | 8/2012 |
| JP | 2013015811 A | 1/2013 |
| JP | 2013037104 A | 2/2013 |
| JP | 2013152465 A | 8/2013 |
| KR | 20080040003 A | 5/2008 |
| WO | 0046617 A1 | 8/2000 |
| WO | 2007122941 A1 | 11/2007 |
| WO | 2014163212 A1 | 10/2014 |

OTHER PUBLICATIONS

International Search Report issued Dec. 22, 2014 in International Application No. PCT/JP2014/075817.
Decision to Grant issued on Apr. 5, 2016 in JP Application No. 2013208479.
Allowed Claims issued on Apr. 5, 2016 in JP Application No. 2013208479.
Notice of Provision of Information by Third Party issued Mar. 15, 2016 in JP Application No. 2013-208479.
Office Action issued Oct. 13, 2016 in CN Application No. 201480054692.6.
Office Action issued Oct. 21, 2016 in KR Application No. 10-2016-7010500.

* cited by examiner

SET OF POLARIZING PLATES AND FRONT-PLATE-INTEGRATED LIQUID CRYSTAL DISPLAY PANEL

CROSS-REFERENCE TO RELATED APPLICATION

This application is a Section 371 of International Application No. PCT/JP2014/075817, filed Sep. 29, 2014, which was published in the Japanese language on Apr. 9, 2015, under International Publication No. WO 2015/050074 A1, and the disclosure of which is incorporated herein by reference.

TECHNICAL FIELD

The present invention relates to a set of polarizing plates including a front-side polarizing plate having a front-plate integrated therewith and a back-side polarizing plate, and a front-plate-integrated liquid crystal display panel in which these polarizing plates are stuck on a liquid crystal cell.

BACKGROUND ART

Liquid crystal display devices have conventionally been used for desk calculators, electronic clocks, personal computers, etc. and in recent years there is an increasing demand therefor, and recently they are also applied to a wide range of applications such as mobile phones, tablet type terminals and the like. These liquid crystal display devices normally include as a main member a liquid crystal display panel including a liquid crystal cell with a pair of polarizing plates that are disposed on front and back sides of the liquid crystal cell.

In the recent market, as mobile devices such as mobile phones and tablet type terminals having a screen increased in size are widely used, there is a demand for reduction in weight and thickness of a constituent member thereof, namely a liquid crystal display panel, and there is a tendency to reduce a liquid crystal cell's glass substrate, a front plate and/or the like in thickness. Furthermore, in order to eliminate reflection and scattering of light at an interface to enhance visibility, there is also a tendency to integrate the front plate with the liquid crystal display panel using a pressure sensitive adhesive, an ultraviolet curing type resin or the like.

Conventional liquid crystal display panels have a thick front plate and a thick liquid crystal cell, and their warping resulting from a polarizing plate's shrinkage has thus been suppressed even in high temperature environments. The above-mentioned recent tendency to reduce in thickness the front plate, the glass substrate used for a liquid crystal cell and the like, however, results in the warping of the liquid crystal display panel, which is attributed to the polarizing plate's shrinkage in high temperature environments, and as a consequence, for example, a problem has arisen that the liquid crystal display panel cannot be accommodated in a casing for a final product.

In order to suppress such warping of the liquid crystal display panel, a conventionally known methodology provides a polarizing plate (a front-side polarizing plate) to be disposed at a viewing side of a liquid crystal cell and a polarizing plate (a back-side polarizing plate) to be disposed at a side opposite to the viewing side of the liquid crystal cell (a back-side) such that the polarizing plates are different in thickness. For example, Japanese Patent Laying-Open No. 2012-058429 (PTD 1) describes a method for suppressing a liquid crystal display panel's warping by reducing a front-side polarizing plate's polarizing film (polarizer) to be smaller in thickness than a back-side polarizing plate's polarizing film.

However, a liquid crystal display panel's warping in a high temperature environment is attributed to a polarizing plate's shrinkage that depends upon a polarizer's thickness, as has been set forth above, and when the polarizer of the front-side polarizing plate is reduced in thickness, as described in PTD 1, a liquid crystal display panel having a front plate integrated using a pressure sensitive adhesive or an ultraviolet curing type resin for improved visibility, in particular, may have the warping, and suppression of the warping is thus not necessarily satisfactory.

Furthermore, Japanese Patent Laying-Open No. 2002-221715 (PTD 2) describes that in a liquid crystal display element (a liquid crystal display panel) using a plastic-substrate-containing liquid crystal cell, a protective layer that constitutes a front-side polarizing plate is smaller in thickness than a protective layer that constitutes a back-side polarizing plate to suppress the amount of warping of the plastic-substrate-containing liquid crystal cell. When the method making protective layers different in thickness, as described in PTD 2, is applied to a liquid crystal display panel having a front-side polarizing plate with a front plate integrated therewith for improved visibility, however, a liquid crystal cell of the panel may have the warping resulting from the protective layer's thermal shrinkage and the problem may arise that the panel cannot be accommodated in a casing for a final product.

CITATION LIST

Patent Document

PTD 1: Japanese Patent Laying-Open No. 2012-058429
PTD 2: Japanese Patent Laying-Open No. 2002-221715

SUMMARY OF INVENTION

Technical Problem

An object of the present invention is to provide a set of polarizing plates that can suppress an amount of warping in a high temperature environment when applied in a liquid crystal display panel, and a front-plate-integrated liquid crystal display panel in which the set of polarizing plates are stuck on a liquid crystal cell.

Solution to Problem

The present invention provides a set of polarizing plates and a front-plate-integrated liquid crystal display panel, as below:

[1] A set of polarizing plates comprising a front-plate-integrated polarizing plate to be disposed at a viewing side of a liquid crystal cell, and a back-side polarizing plate to be disposed at a back-side of the liquid crystal cell, the front-plate-integrated polarizing plate including a front-side polarizing plate and a front plate, the front plate being disposed at a viewing side of the front-side polarizing plate and having a Young's modulus equal to or greater than 2 GPa, where an amount of shrinkage observed in the front-side polarizing plate in an absorption axis direction after the front-side polarizing plate is stuck to a glass substrate and heated at 85° C. for 500 hours is taken as X, and an amount of shrinkage observed in the back-side polarizing plate in an absorption axis direction after the back-side polarizing plate is stuck to a glass substrate and heated at 85° C. for 500 hours is taken as Y, the amount of shrinkage X being smaller than the amount of shrinkage Y.

[2] The set of polarizing plates described at item [1], wherein the amount of shrinkage X is 0.5 mm or less.

[3] The set of polarizing plates described at item [1] or [2], wherein:

the front-side polarizing plate and the back-side polarizing plate have a rectangular shape having a longer side and a shorter side;

the front-side polarizing plate has an absorption axis approximately parallel to a direction of the shorter side; and the back-side polarizing plate has an absorption axis approximately parallel to a direction of the longer side.

[4] The set of polarizing plates described at any one of items [1] to [3], wherein the front-side polarizing plate and the back-side polarizing plate each include:

a polarizer composed of a polyvinyl alcohol-based resin film;

a protective layer laminated on at least one surface of the polarizer; and a pressure sensitive adhesive layer for sticking to the liquid crystal cell.

[5] The set of polarizing plates described at item [4], wherein:

at least one of the front-side polarizing plate and the back-side polarizing plate includes a liquid-crystal-cell-side protective layer laminated on a surface of the polarizer closer to the liquid crystal cell; and the liquid-crystal-cell-side protective layer has an in-plane phase retardation.

[6] The set of polarizing plates described at item [4] or [5], wherein the back-side polarizing plate further includes another optical layer other than the polarizer and the protective layer laminated on an outermost surface opposite to the liquid crystal cell.

[7] A front-plate-integrated liquid crystal display panel comprising the set of polarizing plates described at any one of items [1] to [6], and a liquid crystal cell, wherein:

the front-plate-integrated polarizing plate is stuck, at its front-side polarizing plate's side, on a viewing side of the liquid crystal cell; and the back-side polarizing plate is stuck on a back-side of the liquid crystal cell.

[8] The front-plate-integrated liquid crystal display panel described at item [7], having a warping amount in absolute value of 0.5 mm or less when heated at 85° C. for 240 hours.

Advantageous Effect of Invention

The present invention can provide a front-plate-integrated liquid crystal display panel that can effectively suppress an amount of warping in a high temperature environment and can be easily accommodated in a casing for a final product.

DESCRIPTION OF EMBODIMENTS

<A Set of Polarizing Plates>

Figure 1:
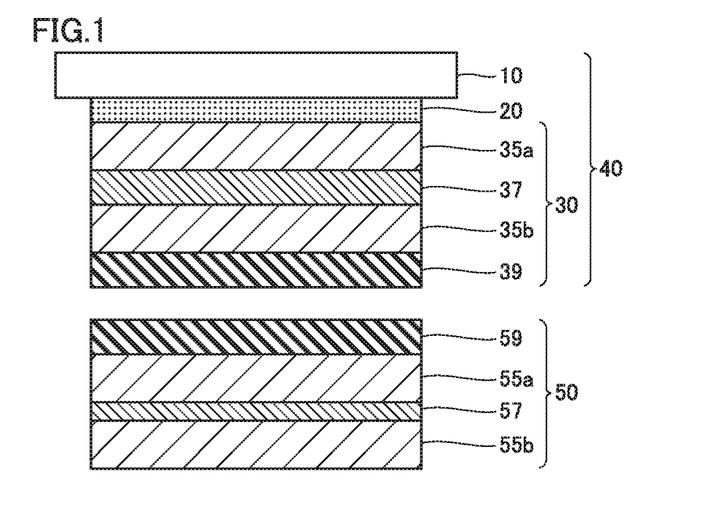
FIG. 1 is a cross-sectional view schematically showing an example of a preferable layer configuration in a set of polarizing plates according to the present invention.
Figure 2:
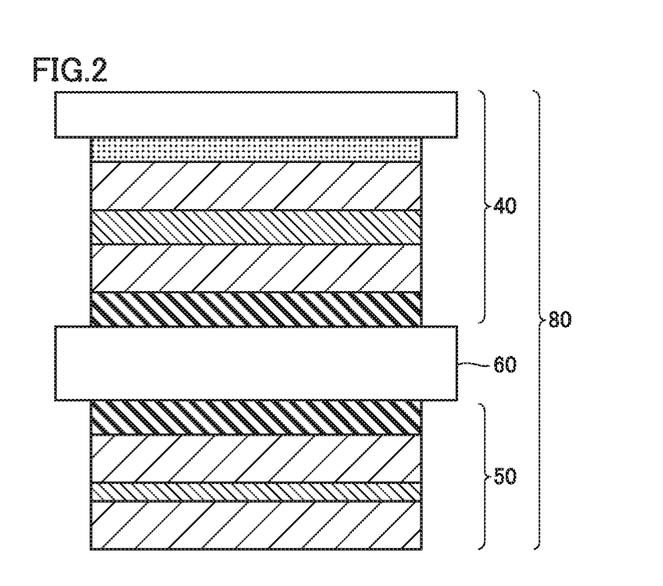
FIG. 2 is a cross-sectional view schematically showing an example of a preferable layer configuration in a front-plate-integrated liquid crystal display panel according to the present invention.

FIG. 1 is a schematic cross-sectional view showing an example of a preferable layer configuration in a set of polarizing plates according to the present invention. Furthermore, FIG. 2 shows a front-plate-integrated liquid crystal display panel 80 formed by sticking the polarizing plate set as shown in FIG. 1 (a front-plate-integrated polarizing plate 40 and a back-side polarizing plate 50) on a liquid crystal cell 60. With reference to FIG. 1, the set of polarizing plates of the present invention includes front-plate-integrated polarizing plate 40 and back-side polarizing plate 50. Front-plate-integrated polarizing plate 40 configuring the set of polarizing plates of the present invention is an integrated article of a front-side polarizing plate 30 and a front plate 10 disposed at a viewing side of front-side polarizing plate 30. In the example of FIG. 1, front-side polarizing plate 30 includes a polarizer 37; a protective layer 35a stuck on a surface of a viewing side of polarizer 37; a protective layer 35b stuck on a surface of polarizer 37 opposite to the viewing side of polarizer 37 (a surface thereof closer to the liquid crystal cell); and a pressure sensitive adhesive layer 39 stuck on an outer surface of protective layer 35b (a surface thereof closer to the liquid crystal cell).

Back-side polarizing plate 50 includes a polarizer 57; a protective layer 55a stuck on a surface of a viewing side of polarizer 57; a protective layer 55b stuck on a surface of polarizer 57 opposite to the viewing side of polarizer 57 (a surface thereof closer to a back-side); and a pressure sensitive adhesive layer 59 stuck on an outer surface of protective layer 55a (a surface thereof closer to liquid crystal cell 60).

(1) Front Plate

Front plate 10 is responsible for suppressing warping of liquid crystal cell 60, protecting liquid crystal cell 60, and/or the like and can be a transparent (preferably, optically transparent) plate having a Young's modulus of equal to or greater than 2 GPa. As long as the above Young's modulus is satisfied, front plate 10 may have a mono-layer structure or a multi-layer structure.

Front plate 10 is disposed at an outermost surface in a final product using the front-plate-integrated liquid crystal display panel, and accordingly, it is required to present sufficient durability even when the panel is used outdoors or semi-outdoors. From such a viewpoint, front plate 10 is composed preferably of an inorganic material such as glass or tempered glass, or an organic material such as polycarbonate-based resin and acrylic resin.

Front plate 10 may be tempered glass, film or the like configuring a touchscreen panel for example. The touchscreen panel is not limited in system, and an electrostatic capacitance system, a surface acoustic wave system, a resistive film system, an electromagnetic induction system, an optical sensor system, an infrared system, etc. are indicated as examples.

Front plate 10 may have functions such as antireflection, antifouling, electromagnetic wave shielding, near-infrared shielding, color adjustment, prevention of scattering of glass, and the like. For example, the front plate having the above function(s) can be a laminate of a substrate formed of the above-indicated inorganic or organic materials and one or more layers (or films) laminated on the substrate and having the above function(s). Front plate 10 of such a multi-layered structure can be fabricated for example by applying directly on the substrate formed of the above-indicated inorganic or organic materials an agent that is effective to provide the above function(s) or by sticking on the substrate a functional film separately produced and having the above function(s).

As shown in FIG. 1, front plate 10 and front-side polarizing plate 30 can be integrated together by sticking them together with an ultraviolet curing type resin or pressure sensitive adhesive 20 therebetween. In order to eliminate reflection and scattering of light at an interface of front plate 10 and front-side polarizing plate 30 to improve visibility, ultraviolet curing type resin or pressure sensitive adhesive 20 preferably has an index of refraction close or equal to an index of refraction of front plate 10 and is preferably optically transparent.

The ultraviolet curing type resin can be a general ultraviolet curable liquid material such as (metha)acrylic ester and epoxy resin. The pressure sensitive adhesive can be that with an acrylic polymer, a silicone-based polymer, polyester, polyurethane, polyether, etc. as a base polymer. Inter alia it is preferable to use an acrylic pressure sensitive adhesive excellent in optical transparency and having high transparency, such as an acrylic pressure sensitive adhesive. Herein, "(metha)acrylic ester" means acrylic ester and/or methacrylic ester, and "(metha)" in (metha)acrylate or the like is also the same in meaning.

(2) Front-Side Polarizing Plate

Front-side polarizing plate 30 is a polarizing plate to be disposed at the viewing side of liquid crystal cell 60 as front-plate-integrated polarizing plate 40 integrated with front plate 10, and at least includes polarizer 37. Front-side polarizing plate 30 normally includes in addition to polarizer 37 a protective layer laminated on at least one surface of polarizer 37 and a pressure sensitive adhesive layer for sticking front-plate-integrated polarizing plate 40 to liquid crystal cell 60. In the example of FIG. 1, protective layers 35a and 35b are stuck on the opposite surfaces of polarizer 37, and pressure sensitive adhesive layer 39 used for sticking to liquid crystal cell 60 is laminated on an outer surface of protective layer 35b closer to liquid crystal cell 60. The example of FIG. 1 is not exclusive, and for example protective layer 35b may be dispensed with and pressure sensitive adhesive layer 39 may be laminated directly on polarizer 37 or the like, and the protective layer may thus be laminated only on one surface of polarizer 37.

Under the situation that front plate 10 is not stuck on front-side polarizing plate 30, in the present invention, an amount of shrinkage X and an amount of shrinkage Y satisfy the following relationship:

$$\text{amount of shrinkage } X < \text{amount of shrinkage } Y \qquad [\text{I}].$$

The amount of shrinkage X represents an amount of shrinkage of the front-side polarizing plate 30 observed after the front-side polarizing plate 30 is heated at 85° C. for 500 hours, and the amount of shrinkage Y represents an amount of shrinkage of the back-side polarizing plate 50 observed after the back-side polarizing plate 50 is heated under the same conditions. The amount of shrinkage as referred to herein is represented by the following expression.

$$\text{amount of shrinkage} = L_0 - L_1 \qquad [\text{II}],$$

where $L_0$ (in mm) represents a length of the polarizing plate in the direction of an absorption axis before it is heated, and $L_1$ (in mm) represents a length of the polarizing plate in the direction of the absorption axis after it is heated. The above absorption axis is more specifically an absorption axis of a polarizer that a polarizing plate has. The amount of shrinkage is measured from a sample formed of a glass substrate and a polarizing plate stuck thereon, and it can be measured specifically in a method described in the item of Examples described hereinafter.

When the set of polarizing plates of the present invention that satisfies the above expression [I] is applied in a front-plate-integrated liquid crystal display panel, it can effectively suppress an amount of warping in a high temperature environment, and for example even in a condition in which the front-plate-integrated liquid crystal display panel is heated at 85° C. for 240 hours, the amount of warping of the front-plate-integrated liquid crystal display panel can be suppressed to 0.5 mm or less in absolute value. Note that the amount of warping of the front-plate-integrated liquid crystal display panel is measured in a method described in the item of Examples described hereinafter.

From a viewpoint of more effectively suppressing the amount of warping of the front-plate-integrated liquid crystal display panel in a high temperature environment, amount of shrinkage Y and amount of shrinkage X preferably have a difference (i.e., amount of shrinkage Y minus amount of shrinkage X) of 0.05 mm or greater, more preferably 0.08 mm or greater. Furthermore, the difference is preferably 500 μm or less, more preferably 300 μm or less.

Figure 3:
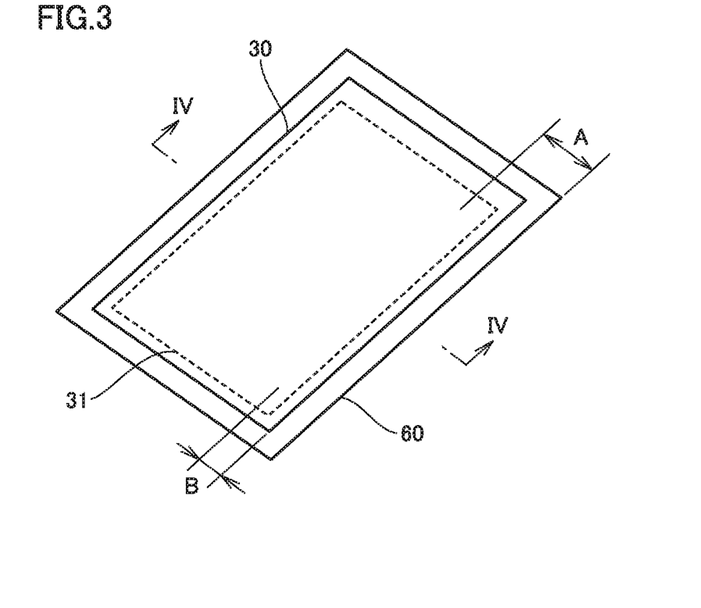
FIG. 3 is a perspective view schematically showing a liquid crystal cell with a front-side polarizing plate stuck thereon.
Figure 4:
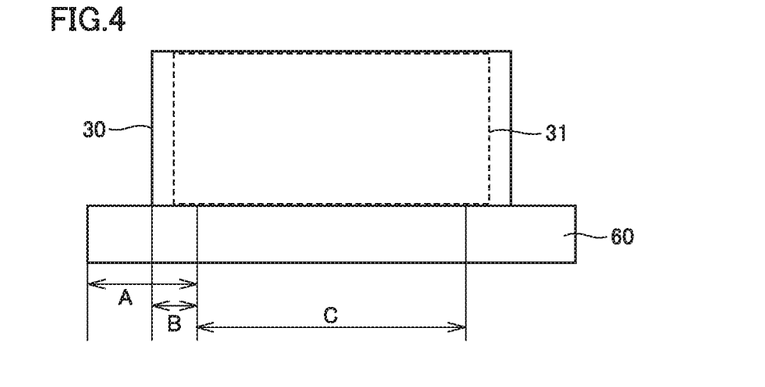
FIG. 4 is a schematic cross-sectional view taken along a line IV-IV shown in FIG. 3.

Amount of shrinkage X of front-side polarizing plate 30 is preferably 0.5 mm or less, more preferably 0.4 mm or less. Amount of shrinkage X of 0.5 mm or less is also advantageous in more effectively suppressing the amount of warping of the front-plate-integrated liquid crystal display panel. Amount of shrinkage X exceeding 0.5 mm is too large an amount of shrinkage so that there is a possibility that front-side polarizing plate 30 may peel off liquid crystal cell 60 in a high temperature environment. Furthermore, suppressing amount of shrinkage X to as small as 0.5 mm or less is also advantageous as follows:

FIGS. 3 and 4 are a schematic perspective view and a schematic cross-sectional view taken along a line IV-IV shown in FIG. 3, respectively, of liquid crystal cell 60 with front-side polarizing plate 30 stuck thereon. Liquid crystal cell 60 can for example have a rectangular shape having a longer side and a shorter side, and correspondingly, front-side polarizing plate 30 can also have a rectangular shape. Generally, front-side polarizing plate 30 is sized to be smaller than liquid crystal cell 60, and, as shown in FIG. 3 and FIG. 4, liquid crystal cell 60 having front-side polarizing plate 30 stuck thereon has a region A in which front-side polarizing plate 30 is not disposed on liquid crystal cell 60 and no image is displayed therein. Front-side polarizing plate 30 and liquid crystal cell 60 are stuck together to have their shorter sides (and longer sides) in parallel (this also applies to back-side polarizing plate 50).

Furthermore, normally, of liquid crystal cell 60, a region in which front-side polarizing plate 30 is disposed thereon does not entirely serve as a region C responsible for displaying an image, and a more limited, inner region will instead be region C responsible for displaying an image (see FIG. 4). This is because normally, at a periphery of region C, a black matrix is formed with a certain width. Such a black matrix is formed in a region B, which cannot be region C responsible for displaying an image, and thus it is not particularly a problem for the liquid crystal display panel that front-side polarizing plate 30 is not disposed on region B.

When liquid crystal cell 60 having front-side polarizing plate 30 stuck thereon is exposed to a high temperature environment, front-side polarizing plate 30 causes thermal shrinkage (see front-side polarizing plate 31 after the thermal shrinkage shown in FIG. 3 and FIG. 4 by a dotted line). The width of region B is normally approximately 0.5 mm, and amount of shrinkage X of 0.5 mm or less thus ensures that even when front-side polarizing plate 30 thermally shrinks an end of front-side polarizing plate 31 after the thermal shrinkage exists within region B, which securely prevents occurrence of display defect resulting from a formation, within region C responsible for displaying an image, of a region where front-side polarizing plate 30 is not disposed.

For a ground similar to the above, amount of shrinkage Y of back-side polarizing plate 50 is also preferably 0.5 mm or less.

Amounts of shrinkage X and Y can be controlled for example by adjusting in hardness a pressure sensitive adhesive layer included in the polarizing plate and used for sticking to liquid crystal cell 60. The harder the pressure sensitive adhesive layer is, the smaller the amount of shrinkage tends to be.

Polarizer 37 used for front-side polarizing plate 30 is not particularly limited, and for example, polyvinyl alcohol-based resin film having a dichroic colorant (iodine, an organic dye or the like) adsorbed and oriented therein is suitably used. The polyvinyl alcohol-based resin configuring polarizer 37 can be obtained by saponifying polyvinyl acetate-based resin. Examples of the polyvinyl acetate-based resin include polyvinyl acetate that is a homopolymer of vinyl acetate, a copolymer of vinyl acetate and other monomer copolymerizable therewith, and the like. The other monomer copolymerizable with vinyl acetate can for example be unsaturated carboxylic acids, olefins, vinyl ethers, unsaturated sulfonic acids, acrylamides having an ammonium group, and the like. The degree of saponification of the polyvinyl alcohol-based resin is normally approximately 85 to 100 mol %, preferably 98 mol % or greater. The polyvinyl alcohol-based resin may be modified, and, for example, polyvinyl formal, polyvinyl acetal, etc. modified with aldehydes can also be used.

The degree of polymerization of the polyvinyl alcohol-based resin is normally approximately 1000 to 10000, preferably approximately 1500 to 5000. The polyvinyl alcohol-based resin and the dichroic colorant are specifically exemplified by those indicated in Japanese Patent Laying-Open No. 2012-159778 as examples.

A film formed of the above polyvinyl alcohol-based resin is used as a raw film for polarizer 37. A method of forming a film of the polyvinyl alcohol-based resin is not limited to any particular method, and the film can be formed by a known method. Although the thickness of the raw film formed of the polyvinyl alcohol-based resin is not limited to a particular thickness, it is approximately 1 to 150 μm, for example. Further taking ease of stretching into consideration, the thickness is preferably 10 μm or more.

Polarizer 37 can be produced for example by a step of uniaxially stretching the above-described polyvinyl alcohol-based resin film, a step of coloring the polyvinyl alcohol-based resin film with the dichroic colorant to cause the film to adsorb the dichroic colorant, a step of treating the polyvinyl alcohol-based resin film that has the dichroic colorant adsorbed therein with an aqueous solution of boric acid, a step of washing the film with water after the treatment with the aqueous solution of boric acid, and finally drying the film. In the process for producing polarizer 37, the polyvinyl alcohol-based resin film may be stretched, colored, treated with boric acid, washed with water, and dried pursuant to a method described for example in Japanese Patent Laying-Open No. 2012-159778. The method described in this document does not use the raw film formed of the above polyvinyl alcohol-based resin; rather, a substrate film is coated with polyvinyl alcohol-based resin to form a polyvinyl alcohol-based resin layer serving as a polarizer, on which a protective layer is laminated to produce a polarizing plate.

The thickness of polarizer 37 can be approximately 2 to 40 μm, and is preferably approximately 3 to 30 μm. Increasing the thickness of polarizer 37 of front-side polarizing plate 30 to be larger than the thickness of polarizer 57 of back-side polarizing plate 50 is advantageous in more effectively suppressing the amount of warping of the front-plate-integrated liquid crystal display panel.

The protective layer stuck on at least one surface of polarizer 37 can be a layer made of transparent resin, and preferably it is made of a resin which is excellent in transparency, uniform optical characteristics, mechanical strength, thermal stability, etc. Specific examples of the transparent resin that configures the protective layer include cellulose-based resin such as triacetyl cellulose and diacetyl cellulose; polyester-based resin such as polyethylene terephthalate, polyethylene isophthalate, and polybutylene terephthalate; (metha)acrylic resin such as polymethyl (metha)acrylate and polyethyl (metha)acrylate; polycarbonate-based resin; polyether sulfone-based resin; polysulfone-based resin; polyimide-based resin; polyolefin-based resin such as polyethylene and polypropylene; and polynorbornene-based resin.

When protective layers 35a and 35b are laminated on the opposite surfaces of polarizer 37, these protective layers 35a and 35b may be identical or different.

Preferably, at least one of front-side polarizing plate 30 and back-side polarizing plate 50 includes a liquid-crystal-cell-side protective layer laminated on a surface of the polarizer closer to liquid crystal cell 60 and this liquid-crystal-cell-side protective layer has an in-plane phase retardation. For example, in front-side polarizing plate 30, protective layer 35b stuck on a side of polarizer 37 closer to liquid crystal cell 60 can be a protective layer having an in-plane phase retardation.

The in-plane phase retardation of the protection layer can be provided by uniaxial stretching or biaxial stretching. While an in-plane phase retardation value $R_0$ may be set as appropriate in accordance with the type of liquid crystal cell 60 applied, generally it is set preferably to 30 nm or more. In-plane phase retardation value $R_0$ has an upper limit for example of approximately 300 nm. In-plane phase retardation value $R_0$ is defined by the following expression:

$$R_0 = (n_x - n_y) \times d \quad \text{[III]},$$

where $n_x$ represents a refractive index of the protective layer in the direction of an in-plane slow axis thereof, $n_y$ represents a refractive index of the protective layer in the direction of an in-plane fast axis thereof (i.e., a direction orthogonal to the direction of the in-plane slow axis), and d represents the thickness of the protective layer.

Protective layer 35a and protective layer 35b that frontside polarizing plate 30 may have normally have a thickness of approximately 5 to 200 μm, preferably 10 μm or more, more preferably 80 μm or less, still more preferably 40 μm or less.

Polarizer 37 and protective layers 35a and 35b can be stuck together using an adhesive or a pressure sensitive adhesive. The adhesive can be an aqueous adhesive containing polyvinyl alcohol-based resin, urethane resin or the like as a major component, a photo-curing type adhesive including photo-curing type resin such as ultraviolet curing type resin (epoxy-based resin etc.); and/or the like. The pressure sensitive adhesive can be that with an acrylic polymer, a silicone-based polymer, polyester, polyurethane, polyether, etc. as a base polymer. Before being stuck on polarizer 37, the surfaces of protective layers 35a and 35b at which protective layers 35a and 35b are stuck on polarizer 37 may undergo a saponification treatment, a corona treatment, primer treatment, anchor coating treatment and/or the like to help adhesion.

When front-side polarizing plate 30 includes protective layer 35a laminated on the viewing side of polarizer 37, protective layer 35a may have an external surface provided with a surface treatment layer such as a hard coat layer, an antireflection layer, an anti-glare layer and/or the like, if necessary. The hard coat layer is a surface treatment layer to prevent a scratch of a surface of front-side polarizing plate 30, and its constituent material is selected from ultraviolet curing type resin, e.g., among acrylic resin, silicone-based resin and/or the like, with its adhesiveness to protective layer 35a, its hardness and the like considered.

The antireflection layer is a surface treatment layer formed for the purpose of preventing reflection of external light at a surface of front-side polarizing plate 30 and can be formed in a known method. The anti-glare layer is a surface treatment layer formed to prevent reduced visibility resulting from a glare of external light in a surface of front-side polarizing plate 30, and generally the anti-glare layer is formed for example by roughening the layer surface such as sandblasting, embossing, or the like; mixing transparent fine particles with an ultraviolet curing type resin; or the like to allow protective layer 35a to have a surface with an irregular structure.

Front-side polarizing plate 30 and/or back-side polarizing plate 50 can have one or more optical layers other than the polarizer and the protective layer and presenting an optical function different than the polarizing plate. Specific examples of the other optical layers include a reflective layer, a semitransparent reflective layer, a phase retardation plate, and a brightness enhancement film by way of example. For example, front-side polarizing plate 30 and/or back-side polarizing plate 50 can be: an elliptically or circularly polarizing plate having the phase retardation plate further laminated on the above-described polarizing plate including a polarizer and a protective layer; a polarizing plate having one protective layer serving as an angle-of-visibility compensation film; a polarizing plate having the brightness enhancement film further laminated on the above-described polarizing plate including a polarizer and a protective layer; or the like.

The phase retardation plate is a so-called λ plate (a ½λ plate or a ¼λ plate) that can form a composite polarizing plate of an elliptical or circular polarization mode that is used for an image display device used in a mobile application, in particular, and the phase retardation plate can be laminated on the above-described protective layer. The composite polarizing plate of the elliptical or circular polarization mode has a function so that when the incident polarization direction is linear polarization it is changed to elliptical polarization or circular polarization and when the incident polarization direction is elliptical or circular polarization it is changed to linear polarization. In particular, as a phase retardation plate that can change elliptical polarization or circular polarization to linear polarization and can change linear polarization to elliptical polarization or circular polarization, what is called a ¼λ plate is used. Furthermore, a ½λ plate has a function to change linear polarization in direction.

A specific example of the phase retardation plate is a stretched film obtained by stretching a resin film selected from polycarbonate-based resin film, polyvinyl alcohol-based resin film, polystyrene-based resin film, polymethyl methacrylate-based resin film, polyolefin-based resin film such as polypropylene, polyarylate-based resin film, polyamide-based resin film, polyolefin-based resin film, polynorbornene-based resin film, and the like. Such a stretched film can be a film processed in an appropriate method such as a uniaxial stretching, biaxial stretching or the like. Furthermore, the phase retardation plate is may be a birefringent film controlled in refractive index in the thickness direction of the film by applying shrinking force and/or stretching force to the film under the condition where the film is adhered to a heat shrinkable film.

The brightness enhancement film is used for the purpose of improvement in brightness in liquid crystal display devices etc., and its specific examples include a reflection type polarization separation sheet designed to introduce anisotropy in reflectance by laminating a plurality of thin films mutually different in refractive index anisotropy, and a circular polarization separation sheet formed of a film substrate and an oriented film of a cholesteric liquid polymer, an oriented liquid crystal layer thereof or the like supported on the film substrate.

The above optical layer can be integrated with the polarizing plate using a pressure sensitive adhesive or an adhesive. The pressure sensitive adhesive or adhesive used is not limited to any specific ones and may be any pressure sensitive adhesive or adhesive selected as appropriate. Preferably, the pressure sensitive adhesive is used in view of convenience in a bonding process, prevention of optical distortion, etc. The pressure sensitive adhesive is not limited to any specific one and can for example be that with an acrylic polymer, a silicone-based polymer, polyester, polyurethane, polyether, etc. as a base polymer. Inter alia, it is preferable to select and use a pressure sensitive adhesive that is excellent in transparency, holds appropriate wettability and cohesive strength, also presents excellent adhesion to the polarizing plate and the optical layer, and furthermore, has satisfactory thermal resistance and can avoid problems such as loosening, peeling and the like in a high temperature environment, such as an acrylic pressure sensitive adhesive.

The layer made of the pressure sensitive adhesive for sticking the optical layer may contain fine particles for presenting a light-scattering property if necessary, and may contain glass fiber, glass beads, resin beads, a filler such as metallic powder or other inorganic powder, a pigment, a coloring agent, an antioxidant, an ultraviolet absorber, etc. Examples of the ultraviolet absorber include a salicylic acid ester-based compound, a benzophenone-based compound, a benzotriazol-based compound, a cyanoacrylate-based compound, a nickel complex salt-based compound, and the like.

Front-side polarizing plate 30 normally has on its outermost surface closer to liquid crystal cell 60 pressure sensitive adhesive layer 39 for sticking the polarizing plate to liquid crystal cell 60. If front-side polarizing plate 30 has protective layer 35b closer to liquid crystal cell 60, pressure sensitive adhesive layer 39 can be laminated on protective layer 35b, whereas if front-side polarizing plate 30 does not have protective layer 35b, pressure sensitive adhesive layer 39 can be laminated directly on polarizer 37. Pressure sensitive adhesive layer 39 can for example be that with an acrylic polymer, a silicone-based polymer, polyester, polyurethane, polyether, etc. as a base polymer. Inter alia, it is preferable to use an acrylic pressure sensitive adhesive as it is excellent in optical transparency, has satisfactory thermal resistance and is thus less liable to problems such as loosening, peeling and the like in a high temperature environment, and is also advantageous in preventing impaired optical characteristics attributed to a thermal expansion difference or the like, suppressing the front-plate-integrated liquid crystal display panel's warping attributed to a thermal expansion difference or the like.

As has been discussed above, amounts of shrinkage X and Y can be controlled for example by adjusting in hardness the pressure sensitive adhesive layer used for sticking to liquid crystal cell 60. The hardness of the pressure sensitive adhesive layer is controllable by adjusting the base polymer's glass transition temperature and degree of cross linking. The thickness of pressure sensitive adhesive layer 39 is normally approximately 50 to 50 µm.

Preferably, an outer surface of pressure sensitive adhesive layer 39 disposed at an outermost surface (and pressure sensitive adhesive layer 59 of back-side polarizing plate 50) is temporarily protected by a separator for the purpose of preventing contamination until pressure sensitive adhesive layer 39 is served for practical use. The separator can be composed of a resin film substrate pursuant to the above protective layer and a peeling coat layer disposed on the resin film substrate and provided by a similar appropriate peeling agent such as a silicone-based peeling agent, a long chain alkyl-based peeling agent, a fluorine-based peeling agent, molybdenum sulfide or the like if necessary.

Front-side polarizing plate 30 can have an external shape for example of a rectangle having a longer side and a shorter side. In that case, the absorption axis of front-side polarizing plate 30 (polarizer 37) and the shorter side of front-side polarizing plate 30 (and hence a shorter side of liquid crystal cell 60 on which front-side polarizing plate 30 is stuck) form an angle normally within ±45 degrees, preferably within ±10 degrees. More preferably, the absorption axis of front-side polarizing plate 30 and the shorter side of front-side polarizing plate 30 are parallel or are approximately parallel (that is, these form an angle within ±7 degrees).

(3) Back-Side Polarizing Plate

Back-side polarizing plate 50 is a polarizing plate to be disposed at a back side of liquid crystal cell 60 (i.e., a side opposite to the viewing side) and at least includes polarizer 57. Back-side polarizing plate 50 normally includes in addition to polarizer 57 a protective layer laminated on at least one surface of polarizer 57 and a pressure sensitive adhesive layer for sticking to liquid crystal cell 60. In the example of FIG. 1, protective layers 55a and 55b are stuck on the opposite surfaces of polarizer 57, and pressure sensitive adhesive layer 59 used for sticking to liquid crystal cell 60 is laminated on an outer surface of protective layer 55a closer to liquid crystal cell 60. The example of FIG. 1 is not exclusive, and for example protective layer 55a may be dispensed with and pressure sensitive adhesive layer 59 may be laminated directly on polarizer 57 or the like, and the protective layer may thus be laminated only on one surface of polarizer 57.

Back-side polarizing plate 50 may be a polarizing plate of any configuration as long as is satisfies the relational expression of the above expression [I] regarding amounts of shrinkage X and Y. As has been set forth above, back-side polarizing plate 50 preferably has amount of shrinkage Y of 0.5 mm or less, more preferably 0.4 mm or less.

The above descriptions for front-side polarizing plate 30 are quoted for a layer configuration of back-side polarizing plate 50, and specific configurations and a sticking method of polarizer 57, protective layers 55a, 55b, pressure sensitive adhesive layer 59, a surface treatment layer formed on the protective layer, other optical layers and the like, which is or may be included in back-side polarizing plate 50.

As has been set forth above, preferably, at least one of front-side polarizing plate 30 and back-side polarizing plate 50 includes a liquid-crystal-cell-side protective layer laminated on a surface of the polarizer closer to liquid crystal cell 60 and this liquid-crystal-cell-side protective layer has an in-plane phase retardation. For example, in back-side polarizing plate 50, protective layer 55a stuck on a side of polarizer 57 closer to liquid crystal cell 60 can be a protective layer having an in-plane phase retardation.

Back-side polarizing plate 50 preferably has the above-described, one or more other optical layers laminated on an outermost surface opposite to liquid crystal cell 60, and the optical layer(s) that back-side polarizing plate 50 has on the above outermost surface thereof can be a brightness enhancement film or the like.

Back-side polarizing plate 50 can have an external shape for example of a rectangle having a longer side and a shorter side. In that case, the absorption axis of back-side polarizing plate 50 (polarizer 57) and the longer side of back-side polarizing plate 50 (and hence a longer side of liquid crystal cell 60 on which back-side polarizing plate 50 is stuck) form an angle normally within +45 degrees, preferably within +10 degrees. More preferably, the absorption axis of back-side polarizing plate 50 and the longer side of back-side polarizing plate 50 are parallel or are approximately parallel (that is, these form an angle within +7 degrees).

<Front-Plate-Integrated Liquid Crystal Display Panel>

A front-plate-integrated liquid crystal display panel according to the present invention is a liquid crystal display panel having front-plate-integrated polarizing plate 40 and back-side polarizing plate 50 stuck on liquid crystal cell 60. FIG. 2 is a cross-sectional view schematically showing an example of a preferable layer configuration in a front-plate-integrated liquid crystal display panel according to the present invention, and shows front-plate-integrated liquid crystal display panel 80 formed by sticking the polarizing plate set as shown in FIG. 1 (front-plate-integrated polarizing plate 40 and back-side polarizing plate 50) on liquid crystal cell 60.

As shown in FIG. 2, front-plate-integrated polarizing plate 40 is stuck via pressure sensitive adhesive layer 39 to the viewing side of liquid crystal cell 60 so that front plate 10 faces toward the viewing side, i.e., front-side polarizing plate 30 side of front-plate-integrated polarizing plate 40 is stuck to the viewing side of liquid crystal cell 60. Back-side polarizing plate 50 is stuck via pressure sensitive adhesive layer 59 to the back-side of liquid crystal cell 60. Front-plate-integrated polarizing plate 40 and back-side polarizing plate 50 are stuck such that their shorter sides are parallel to the shorter sides of liquid crystal cell 60.

A driving mode of liquid crystal cell 60 may be any conventionally known mode such as a VA mode, an IPS mode, a TN mode, or the like, and front-plate-integrated polarizing plate 40 and back-side polarizing plate 50 are stuck on a liquid crystal cell substrate, which can be made of glass, transparent resin, etc.

Front-plate-integrated liquid crystal display panel 80 of the present invention employs the above-described set of polarizing plates. Therefore, when it is heated at 85° C. for 240 hours, its warping amount in absolute value can be 0.5 mm or less, furthermore 0.4 mm or less, still furthermore 0.3 mm or less. Thus, front-plate-integrated liquid crystal display panel 80 of the present invention can suppress warping in a high temperature environment, and can be easily accommodated in a casing for a final product even after it is placed in the high temperature environment.

EXAMPLES

The present invention will be described more specifically below by way of Examples, but the present invention is not limited by these Examples. In Examples, % and part(s) expressing the content or the use amount are based on weight, unless otherwise indicated.

Example 1

Figure 5:
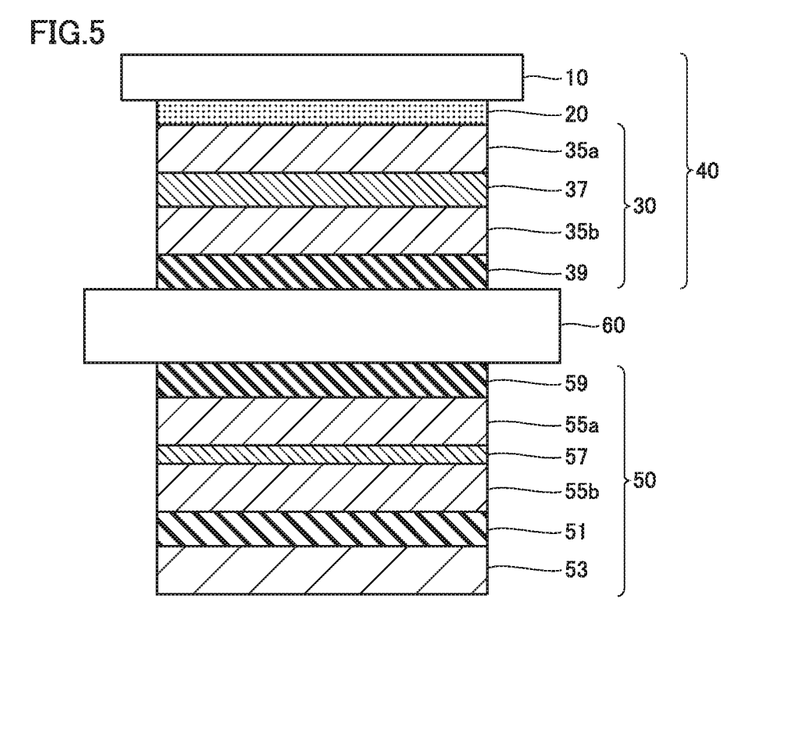
FIG. 5 is a schematic cross-sectional view showing a layer configuration of a front-plate-integrated liquid crystal display panel fabricated in Example 1.

A front-plate-integrated liquid crystal display panel having a layer configuration shown in FIG. 5 was fabricated in the following procedure.

(1) Fabrication of Front-Side Polarizing Plate 30

A 60 µm-thick polyvinyl alcohol film (with an average polymerization degree of approximately 2400 and a degree of saponification of 99.9 mol % or more) was uniaxially stretched by dry stretching with a stretching magnification of approximately five times and was immersed in pure water of 60° C. for one minute while maintaining the tension of the film and subsequently, immersed in an aqueous solution in which a weight ratio of iodine/potassium iodide/water was 0.05/5/100 at 28° C. for 60 seconds. Thereafter the film was immersed in an aqueous solution in which a weight ratio of potassium iodide/boric acid/water was 8.5/8.5/100 at 72° C. for 300 seconds. Subsequently, the film was washed with pure water of 26° C. for 20 seconds, and thereafter dried at 65° C. to obtain polarizer 37 having a thickness of 23 µm and formed of the polyvinyl alcohol film with iodine adsorbed and oriented therein.

Then, on one surface of polarizer 37 thus obtained, a water-based epoxy-based adhesive, which was prepared by dissolving 3 parts of a carboxyl group-modified polyvinyl alcohol [trade name: "KL-318" obtained from Kuraray Co., Ltd.] in 100 parts of water to obtain an aqueous solution and adding into the aqueous solution 1.5 parts of a polyamide epoxy-based additive of water-soluble epoxy resin [trade name: "Sumirez Resin 650(30)" produced by Taoka Chemical Co., Ltd., an aqueous solution having a solid content concentration of 30%], was applied and protective layer 35a of a 40 µm-thick triacetyl cellulose film [trade name: "KC4UY" produced by Konica Minolta Opto Inc.] was stuck thereon, and on an opposite side of polarizer 37, protective layer 35b of a non-stretched film having a thickness of 23 µm and made of norbornene-based resin [trade name: "ZEONOR" produced by Nippon Zeon Co., Ltd.] was stuck using the aforementioned adhesive. Thereafter, on an outer surface of protective layer 35b, a pressure sensitive adhesive [trade name: "NSS5-3CMT" produced by New Tac Kasei Co., Ltd, an acrylic pressure sensitive adhesive] was applied to form pressure sensitive adhesive layer 39 of 20 µm in thickness to thus fabricate front-side polarizing plate 30.

(2) Fabrication of Back-Side Polarizing Plate 50

A 30 µm-thick polyvinyl alcohol film (with an average polymerization degree of approximately 2400 and a degree of saponification of 99.9 mol % or more) was uniaxially stretched by dry stretching with a stretching magnification of approximately five times and was immersed in pure water of 60° C. for one minute while maintaining the tension of the film and subsequently, immersed in an aqueous solution in which a weight ratio of iodine/potassium iodide/water was 0.05/5/100 at 28° C. for 60 seconds. Thereafter the film was immersed in an aqueous solution in which a weight ratio of potassium iodide/boric acid/water was 8.5/8.5/100 at 72° C. for 300 seconds. Subsequently, the film was washed with pure water of 26° C. for 20 seconds, and thereafter dried at 65° C. to obtain polarizer 57 having a thickness of 11 µm and formed of the polyvinyl alcohol film with iodine adsorbed and oriented therein.

Then, on polarizer 57 thus obtained, the same method as that employed for front-side polarizing plate 30 was employed with the same epoxy-based adhesive as above to stick protective layer 55a of the above-mentioned "ZEONOR" of 23 µm in thickness and protective layer 55b of the above-mentioned "KC4UY" of 40 µm in thickness.

Then, on an outer surface of protective layer 55b, a 5 µm-thick pressure sensitive adhesive [trade name: "#L2" produced by Lintec Corporation, an acrylic pressure sensitive adhesive] was stuck to form pressure sensitive adhesive layer 51 and thereafter, brightness enhancement film 53 of 26 µm in thickness [trade name: "Advanced Polarized Film, Version 3" produced by 3M Company] was stuck thereon. Thereafter, on an outer surface of protective layer 55a, a pressure sensitive adhesive [trade name: "#KZ" produced by Lintec Corporation, an acrylic pressure sensitive adhesive] was applied to form pressure sensitive adhesive layer 59 of 20 µm in thickness to thus fabricate back-side polarizing plate 50.

(3) Fabrication of Front-Plate-Integrated Liquid Crystal Display Panel

Front-side polarizing plate 30 obtained as described above at item (1) was cut to have a size of 5 inches such that the absorption axis of polarizer 37 was parallel to the shorter side of liquid crystal cell 60, and back-side polarizing plate 50 obtained as described above at item (2) was also cut to have a size of 5 inches such that the absorption axis of polarizer 57 was parallel to the longer side of liquid crystal cell 60. The two polarizing plates cut as above were then stuck on liquid crystal cell 60 via pressure sensitive adhesive layer 39 and pressure sensitive adhesive layer 59, respectively, so that the shorter sides of the two polarizing plates were parallel to the shorter sides of liquid crystal cell 60.

Then on the protective layer 35a side of front-side polarizing plate 30 an ultraviolet curing type optical elastic resin [trade name: "Super View Resin" produced by Dexerials Corporation] was applied and thereon front plate 10 having a Young's modulus of 70 GPa and having a thickness of 0.55 mm [trade name: "Gorilla" produced by Corning Incorporated] was laminated. Then ultraviolet rays ["D valve" produced by Fusion UV Systems Inc., integrated quantity of light: 1200 mJ/cm$^2$] was emitted from the front plate 10 side to thus fabricate a front-plate-integrated liquid crystal display panel.

Example 2

Figure 6:
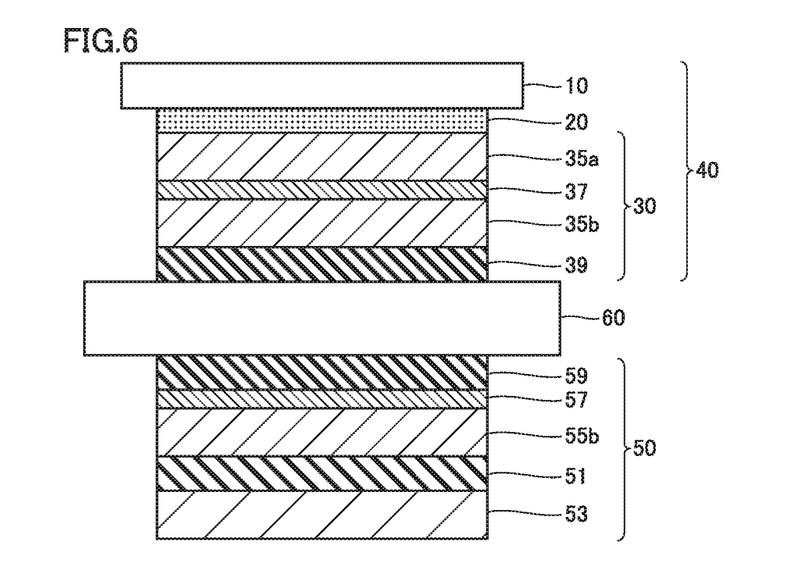
FIG. 6 is a schematic cross-sectional view showing a layer configuration of a front-plate-integrated liquid crystal display panel fabricated in Example 2.

A front-plate-integrated liquid crystal display panel having a layer configuration shown in FIG. 6 was fabricated in the following procedure.

(1) Fabrication of Front-Side Polarizing Plate 30

Except that an 11 μm-thick polarizer was used as polarizer 37, front-side polarizing plate 30 was fabricated by the same method as described in Example 1 at item (1) 11 μm-thick polarizer 37 was fabricated in the method described in Example 1 at item (2).

(2) Fabrication of Back-Side Polarizing Plate 50

Acetoacetyl group modified polyvinyl alcohol powder having an average polymerization degree of 1100 and a degree of saponification of 99.5 mol % [trade name: "Gohsefimer Z-200" produced by The Nippon Synthetic Chemical Industry Co., Ltd.] was dissolved in hot water of 95° C. to prepare an aqueous solution of a concentration of 3%. Into this aqueous solution, a cross-linking agent of a water-soluble polyamide epoxy resin [trade name: "Sumirez Resin 650" produced by Taoka Chemical Co., Ltd., an aqueous solution having a solid content concentration of 30%] was mixed at a ratio of 5 parts per 6 parts of a solid content of polyvinyl alcohol to prepare a coating liquid for primer. Then a substrate film (a polypropylene film having a thickness of 110 μm and a melting point of 163° C.) was subjected to a corona treatment and the corona-treated surface was coated with the coating liquid for primer using a micro gravure coater. The substrate film was then dried at 80° C. for 10 minutes to form a 0.2 μm-thick primer layer.

Then, polyvinyl alcohol powder having an average polymerization degree of 2400 and a degree of saponification of 98.0-99.0 mol % [trade name: "PVA124" obtained from Kuraray Co., Ltd.] was dissolved in hot water of 95° C. to prepare an aqueous solution of polyvinyl alcohol of a concentration of 8%. The obtained aqueous solution was applied on the primer layer of the above substrate film using a lip coater at room temperature, and dried at 80° C. for 20 minutes to provide a laminated film composed of the substrate film/the primer layer/a polyvinyl alcohol layer.

Then the obtained laminated film was subjected to a free end longitudinal uniaxial stretching treatment at 160° C. with a stretching magnification of 5.8 times. The stretched laminated film thus obtained had a total thickness of 28.5 μm and the polyvinyl alcohol layer had a thickness of 5.0 μm.

The stretched laminated film thus obtained was immersed in an aqueous solution in which a weight ratio of water/iodine/potassium iodide was 100/0.35/10 at 26° C. for 90 seconds so as to be colored, and thereafter the film was washed with pure water of 10° C. The stretched laminated film was then immersed in an aqueous solution in which a weight ratio of water/boric acid/potassium iodide was 100/9.5/5 at 76° C. for 300 seconds to crosslink the polyvinyl alcohol. Then, the film was washed with pure water of 10° C. for 10 seconds and finally dried at 80° C. for 200 seconds. A polarizing laminated film was thus fabricated that was composed of a polypropylene substrate film and polarizer 57 deposited on the film substrate and formed of a polyvinyl alcohol layer having iodine adsorbed and oriented therein.

Then, on a surface of the obtained polarizing laminated film opposite to the substrate film, (i.e., on a polarizer surface), a water-based epoxy-based adhesive, which was prepared by dissolving 3 parts of a carboxyl group-modified polyvinyl alcohol [trade name: "KL-318" obtained from Kuraray Co., Ltd.] in 100 parts of water to obtain an aqueous solution and adding into the aqueous solution 1.5 parts of a polyamide epoxy-based additive of water-soluble epoxy resin [trade name: "Sumirez Resin 650(30)" produced by Taoka Chemical Co., Ltd., an aqueous solution having a solid content concentration of 30%], was applied and protective layer 55b of a 25 μm-thick triacetyl cellulose film [trade name: "KC2UA" produced by Konica Minolta Opto Inc.] was stuck thereon, and the substrate film is alone peeled off and a polarizing plate made of protective layer 55b/polarizer 57/a primer layer was thus obtained.

Thereafter, on an outer surface of protective layer 55b, a 5 μm-thick pressure sensitive adhesive [trade name: "#L2" produced by Lintec Corporation, an acrylic pressure sensitive adhesive] was stuck to form pressure sensitive adhesive layer 51 and thereafter, brightness enhancement film 53 of 26 μm in thickness [trade name: "Advanced Polarized Film, Version 3" produced by 3M Company] was stuck thereon. Thereafter, directly on an outer surface of polarizer 57, a pressure sensitive adhesive [trade name: "#KZ" produced by Lintec Corporation, an acrylic pressure sensitive adhesive] was applied to form pressure sensitive adhesive layer 59 of 20 μm in thickness to thus fabricate back-side polarizing plate 50.

(3) Fabrication of Front-Plate-Integrated Liquid Crystal Display Panel

Except that front-side polarizing plate 30 and back-side polarizing plate 50 obtained in the present example at items (1) and (2) above were used, a front-plate-integrated liquid crystal display panel was fabricated by the same method as described in Example 1.

Example 3

(1) Fabrication of Front-side Polarizing Plate 30

Except that an 11 μm-thick polarizer was used as polarizer 37 and that a 25 μm-thick triacetyl cellulose film [trade name: "KC2UA" produced by Konica Minolta Opto Inc.] was used as protective layer 35a, front-side polarizing plate 30 was fabricated by the same method as described in Example 1 at item (1). 11 μm-thick polarizer 37 was fabricated in the method described in Example 1 at item (2)

(2) Fabrication of Back-Side Polarizing Plate 50

A polarizing plate of the same configuration as front-side polarizing plate 30 was fabricated according to the present example, item (1). Thereafter, on an outer surface of protective layer 55b (TAC film), a 5 μm-thick pressure sensitive adhesive [trade name: "#L2" produced by Lintec Corporation, an acrylic pressure sensitive adhesive] was stuck to form pressure sensitive adhesive layer 51 and thereafter, brightness enhancement film 53 of 26 μm in thickness [trade name: "Advanced Polarized Film, Version 3" produced by 3M Company] was stuck thereon. Thereafter, directly on an outer surface of protective layer 55a ("ZEONOR"), a pressure sensitive adhesive [trade name: "#KZ" produced by Lintec Corporation, an acrylic pressure sensitive adhesive] was applied to form pressure sensitive adhesive layer 59 of 25 μm in thickness to thus fabricate back-side polarizing plate 50.

(3) Fabrication of Front-Plate-Integrated Liquid Crystal Display Panel

Except that front-side polarizing plate 30 and back-side polarizing plate 50 obtained in the present example at items (1) and (2) above were used, a front-plate-integrated liquid crystal display panel was fabricated by the same method as described in Example 1.

Comparative Example 1

(1) Fabrication of Front-Side Polarizing Plate 30

Except that a pressure sensitive adhesive [trade name: "#KZ" produced by Lintec Corporation, an acrylic pressure sensitive adhesive] was applied to form pressure sensitive adhesive layer 39 of 20 μm in thickness, front-side polarizing plate 30 was fabricated by the same method as described in Example 1 at item (1).

(2) Fabrication of Back-Side Polarizing Plate 50

Except that a pressure sensitive adhesive [trade name: "NSS5-3CMT" produced by New Tac Kasei Co., Ltd, an acrylic pressure sensitive adhesive] was applied to form pressure sensitive adhesive layer 59 of 20 μm in thickness, back-side polarizing plate 50 was fabricated by the same method as described in Example 1 at item (2).

(3) Fabrication of Front-Plate-Integrated Liquid Crystal Display Panel

Except that front-side polarizing plate 30 and back-side polarizing plate 50 obtained in the comparative example at items (1) and (2) above were used, a front-plate-integrated liquid crystal display panel was fabricated by the same method as described in Example 1.

The amounts of shrinkage in a high temperature environment of front-side polarizing plates 30 (in a state without being integrated with front plate 10) and back-side polarizing plates 50 fabricated in Examples 1 to 3 and Comparative Example 1, and the amounts of warping in a high temperature environment of the front-plate-integrated liquid crystal display panels fabricated in Examples 1 to 3 and Comparative Example 1 were measured in the following method. An obtained result is shown in table 1.

(Amount of Shrinkage of Polarizing Plate)

A test piece for measuring the amount of shrinkage was cut out of the obtained polarizing plate. The shape of test piece was a square or a rectangle having two opposite sides parallel to a stretching direction (that is, an absorption axis direction of the polarizer) and the sides parallel to the stretching direction had a length of 30 to 50 mm and the sides orthogonal thereto had a length of 20 to 50 mm. The test piece was stuck via its pressure sensitive adhesive layer to alkali-free glass [trade name: "EAGLE XG" produced by Corning Incorporated], and left in an environment of 85° C. for 500 hours. A length $L_0$ in the absorption axis direction before being left in the environment of 85° C. for 500 hours and a length $L_1$ in the absorption axis direction after being left in the environment were measured using a two-dimensional measurement instrument "NEXIV VMR-12072" produced by Nikon Corporation, and the following expression.

$$\text{Amount of shrinkage} = L_0 - L_1 \quad [\text{II}]$$

was used to obtain the amount of shrinkage of the polarizing plates. X represents an amount of shrinkage of front-side polarizing plate 30 and Y represents an amount of shrinkage of back-side polarizing plate 50.

(Amount of Warping of Front-Plate-Integrated Liquid Crystal Display Panel)

The front-plate-integrated liquid crystal display panel was left in an environment of 85° C. for 240 hours and thereafter, with front plate 10 facing upward, placed on the measuring table of a two-dimensional measurement instrument "NEXIV VMR-12072" produced by Nikon Corporation. The instrument was focused on a surface of the measuring table, and with reference thereto the instrument was focused on the front-plate-integrated liquid crystal display panel at the four corners, the four sides' respective centers, and a surface's center (for a total of 9 points) and measured their distances from the focal point serving as the reference, and a distance from the measuring table that is the largest in absolute value is determined as an amount of warping.

TABLE 1

| Unit: mm | amount of shrinkage X (front-side polarizing plate) | amount of shrinkage Y (back-side polarizing plate) | amount of warping of liquid crystal display panel |
|---|---|---|---|
| Example 1 | 0.30 | 0.40 | 0.10 |
| Example 2 | 0.15 | 0.30 | 0.20 |
| Example 3 | 0.20 | 0.50 | 0.30 |
| Comparative Example 1 | 0.80 | 0.30 | 0.70 |

REFERENCE SIGNS LIST

10: front plate; 20: ultraviolet curing type resin or pressure sensitive adhesive, 30: front-side polarizing plate; 31: front-side polarizing plate after thermal shrinkage; 35a, 35b: protective layer of front-side polarizing plate; 37: polarizer of front-side polarizing plate; 39: pressure sensitive adhesive layer of front-side polarizing plate; 40: front-plate-integrated polarizing plate; 50: back-side polarizing plate; 51: pressure sensitive adhesive layer; 53: brightness enhancement film; 55a, 55b: protective layer of back-side polarizing plate; 57: polarizer of back-side polarizing plate; 59: pressure sensitive adhesive layer of back-side polarizing plate, 60: liquid crystal cell; 80: front-plate-integrated liquid crystal display panel.

The invention claimed is:

1. A set of polarizing plates comprising a front-plate-integrated polarizing plate to be disposed at a viewing side of a liquid crystal cell, and a back-side polarizing plate to be disposed at a back-side of the liquid crystal cell,
   the front-plate-integrated polarizing plate including a front-side polarizing plate and a front plate,
   the front plate being disposed at a viewing side of the front-side polarizing plate and having a Young's modulus equal to or greater than 2 GPa,
   the back-side polarizing plate having an amount of shrinkage Y of 0.5 mm or less in an absorption axis direction when stuck to a glass substrate and heated at 85° C. for 500 hours,
   the front-side polarizing plate having an amount of shrinkage X in an absorption axis direction when stuck to a glass substrate and heated at 85° C. for 500 hours,
   the amount of shrinkage X being smaller than the amount of shrinkage Y,
   the front-side polarizing plate and the back-side polarizing plate each comprising a pressure sensitive adhesive layer for sticking to the liquid crystal cell, and
   the pressure sensitive adhesive layer of the front-side polarizing plate and the pressure sensitive adhesive layer of the back-side polarizing plate having a thickness of 5 to 50 μm.

2. The set of polarizing plates according to claim 1, wherein the amount of shrinkage X is 0.5 mm or less.

3. The set of polarizing plates according to claim 1, wherein:
   the front-side polarizing plate and the back-side polarizing plate have a rectangular shape having a longer side and a shorter side;
   the front-side polarizing plate has an absorption axis approximately parallel to a direction of the shorter side; and
   the back-side polarizing plate has an absorption axis approximately parallel to a direction of the longer side.

4. The set of polarizing plates according to claim 1, wherein the front-side polarizing plate and the back-side polarizing plate each further include:
- a polarizer composed of a polyvinyl alcohol-based resin film; and
- a protective layer laminated on at least one surface of the polarizer.

5. The set of polarizing plates according to claim 4, wherein:
- at least one of the front-side polarizing plate and the back-side polarizing plate includes a liquid-crystal-cell-side protective layer laminated on a surface of the polarizer closer to the liquid crystal cell; and
- the liquid-crystal-cell-side protective layer has an in-plane phase retardation.

6. The set of polarizing plates according to claim 4, wherein the back-side polarizing plate further includes another optical layer other than the polarizer and the protective layer laminated on an outermost surface opposite to the liquid crystal cell.

7. A front-plate-integrated liquid crystal display panel comprising the set of polarizing plates according to claim 1, and a liquid crystal cell, wherein:
- the front-plate-integrated polarizing plate is stuck, at its front-side polarizing plate's side, on a viewing side of the liquid crystal cell; and
- the back-side polarizing plate is stuck on a back-side of the liquid crystal cell.

8. The front-plate-integrated liquid crystal display panel according to claim 7, having a warping amount in absolute value of 0.5 mm or less when heated at 85° C. for 240 hours.

* * * * *